United States Patent [19]
Goss

[11] Patent Number: 5,661,619
[45] Date of Patent: Aug. 26, 1997

[54] GIMBALLING FLEXURE WITH STATIC TORQUE OFFSET COMPENSATION FEATURE

[75] Inventor: Lloyd C. Goss, Bloomington, Minn.

[73] Assignee: Hutchinson Technology Incorporated, Hutchinson, Minn.

[21] Appl. No.: 517,672

[22] Filed: Aug. 22, 1995

Related U.S. Application Data

[63] Continuation of Ser. No. 165,749, Dec. 10, 1993, abandoned.
[51] Int. Cl.$^6$ .............................. G11B 5/48; G11B 21/16
[52] U.S. Cl. ............................................................. 360/104
[58] Field of Search .................................. 360/102, 103, 360/104

[56] References Cited

U.S. PATENT DOCUMENTS

| | | | |
|---|---|---|---|
| 4,470,088 | 9/1984 | Fick | 360/105 |
| 4,797,763 | 1/1989 | Levy et al. | 360/104 |
| 5,019,931 | 5/1991 | Ohwe et al. | 360/104 |
| 5,079,660 | 1/1992 | Yumura et al. | 360/104 |
| 5,299,080 | 3/1994 | Mizuno et al. | 360/103 |

FOREIGN PATENT DOCUMENTS

| | | | |
|---|---|---|---|
| 62-65275 | 3/1987 | Japan | 360/104 |
| 63-90084 | 4/1988 | Japan | 360/104 |
| 2-91867 | 3/1990 | Japan | 360/104 |
| 3-16069 | 1/1991 | Japan | 360/103 |

Primary Examiner—Robert S. Tupper
Assistant Examiner—William J. Klimowicz
Attorney, Agent, or Firm—Faegre & Benson

[57] ABSTRACT

A head suspension for attachment to a disk drive rigid arm comprises a load beam in which the flexure has a tongue provided with a shaped feature oriented toward the head on the slider-confronting surface of the tongue along at least one static offset torque axis. The shaped feature, in conjunction with an adhesive bond area between the flexure tongue and the top of the slider, is used to eliminate static roll and/or static pitch offsets between the suspension and the slider.

34 Claims, 6 Drawing Sheets

GIMBALLING FLEXURE WITH STATIC TORQUE OFFSET COMPENSATION FEATURE

This application is a continuation of Ser. No. 08/165,749, filed Dec. 10,1993, now abandoned.

FIELD OF THE INVENTION

The present invention relates to a gimballing flexure having a shaped feature on the head slider confronting surface of the flexure tongue, which allows compensation, relative to the suspension assembly, along either or both of the pitch and roll axes, during bonding of the head slider to the flexure tongue.

BACKGROUND OF THE INVENTION

Standard head suspension assemblies (HSAs) include, as component elements, a base plate, a load beam, a gimballing flexure and a head slider. The base plate is attached to a proximal end of the load beam, and is configured for mounting the load beam to an actuator arm of a disk drive. The flexure is positioned on a distal end of the load beam. Mounted to the flexure is a head slider, which is thereby supported in read/write orientation with respect to an associated disk.

A conventional flexure, sometimes referred to as a Watrous gimballing flexure design, is formed from a single sheet of material and includes a pair of outer flexible arms about a central aperture and a cross piece extending across and connecting the arms at a distal end of the flexure. A flexure tongue is joined to the cross piece and extends from the cross piece into the aperture. A free end of the tongue is centrally located between the flexible arms. The head slider is mounted to the free end of the flexure tongue.

The head slider must be mounted to the flexure tongue so that the head slider is in a predetermined (e.g., planar and parallel) relationship to the disk surface. During the process of manufacturing and assembling the HSA, any lack of precision in forming or assembling the individual elements contributes to a lack of planarity in the surfaces of the elements. A buildup of such deviations from tolerance limits in the individual elements can cause deviation from desired planar parallelism in the final head suspension assembly. The parameters of static roll and static pitch torque in the final head suspension assembly result from these inherent manufacturing and assembly tolerance buildups.

Ideally, for optimum operation of the disk drive as a whole, during assembly of the head slider to the flexure tongue, the mounting surface datum (to which the load beam is mounted during HSA assembly) and the slider surface datum must be parallel to each other in both planar directions. The mounting surface datum and the slider surface datum are level surfaces used as reference points or surfaces in establishing the planar parallelism of the actuator mounting surface and the head slider surface relative to each other. The upper and lower surfaces of the head slider are also manufactured according to specifications requiring them to be essentially or nominally parallel to each other.

Static roll torque and static pitch torque have their rotational axes about the center of the head slider in perpendicular planar directions, and are caused by unequal forces acting to maintain the desired planar parallelism on the head slider while it is flying over the disk. That is, static torque is defined as a torque or a moment of force tending to cause rotation to a desired static (i.e., reference) attitude about a specific axis.

As applied to a head suspension assembly, the axis of roll torque is coincident with the longitudinal axis of the head suspension assembly. The value of static roll torque is measured on either side of the static roll torque axis when the flexure tongue is parallel with the base plate. If the flexure has been twisted about the static roll torque axis during manufacture (i.e., there is planar non-parallelism of the flexure tongue with respect to the disk along this axis), the values measured on either side of the roll torque axis will not be the same. Thus, when the attached head slider is in flying attitude to the associated disk surface, force (referred to as an induced roll torque value) is needed to twist the tongue back into planar parallel alignment to the disk.

The axis of pitch torque is perpendicular to the longitudinal axis of the head suspension assembly. The value of static pitch torque is measured on either side of the static pitch torque axis when the flexure tongue is parallel with the base plate. If the flexure has been twisted about the static pitch torque axis during manufacture (i.e., there is planar non-parallelism of the flexure tongue with respect to the disk along this axis), the values measured on either side of the pitch torque axis will not be the same. Thus, when the attached head slider is in flying attitude to the associated disk surface, force (referred to as an induced pitch torque value) is needed to twist the tongue back into parallel alignment to the disk. It will of course be understood that in actual conditions the flexure can be twisted with respect to both axes, requiring alignment about both the pitch axis and the roll axis.

These torques can also be referred to in terms of static attitude at the flexure/slider interface and in terms of the pitch and roll stiffness of the flexure. The ideal or desired pitch and roll torques are best defined as those which would exist if the components were installed in an ideal planar parallel configuration in a disk drive. In an actual disk drive, pitch and roll static torques produce adverse forces between the air bearing surface of the slider and the disk, affecting the flying height of the slider above the disk, resulting in deviations from optimum read/write and head/disk interface separation.

In a conventional flexure design, the flexure tongue is offset from the flexure toward the head slider to allow gimballing clearance between the upper surface of the head slider and the lower surface of the flexure. This offset is formed where the flexure tongue and cross piece join, in conjunction with the dimple that is formed on the flexure tongue. This standard flexure design evidences a low value of pitch stiffness and a moderate value of roll stiffness. Pitch stiffness and roll stiffness are each measured in force X distance/degree. Thus, in developing a new design for a flexure, it would be most desirable to provide a flexure and a method of fabrication which accurately compensate and correct for manufacturing variations that currently contribute to static pitch and roll torque errors. The manufacturing process should be efficient to perform corrections for static roll torque, as well as for static pitch torque, since the ability to correct for both static torques is needed for proper flexure/slider alignment.

SUMMARY OF THE INVENTION

The present invention is a head suspension assembly (HSA) for supporting a head slider with respect to its associated disk surface. This assembly includes a load beam having proximal and distal ends, with the proximal end configured for mounting to a base plate. A flexure tongue extends resiliently from the distal end of the load beam and has a slider-engaging surface configured for mounting to a head slider. The slider-engaging surface of the tongue is configured with a shaped feature sloped about a first axis to correct for first axis static offset errors between the flexure tongue and the head slider. The shaped feature may also be sloped about a second axis to correct for second axis static offset errors, or can have a configuration which is sloped with respect to both axes to correct for both static pitch and static roll offset errors. The slider-engaging surface of the flexure tongue may be configured with a shaped feature in a variety of configurations, such as a cylindrical section, a spherical section or an ovoid section.

This invention also includes a method for mounting a head slider to the above-described HSA. The method includes providing an assembly fixture including a load beam datum surface configured to receive the proximal end of the load beam and a slider datum surface configured to receive the head slider. The load beam and slider datum surfaces are positioned and oriented with respect to one another, so as to position and orient the load beam and head slider in a predetermined (generally parallel and planar) relationship. The sloped shaped feature on the flexure tongue allows adjustment of the slider/flexure interface along the appropriate axis (axes) to achieve the desired optimum parallel planarity. With the load beam and the head slider rigidly positioned to these respective datum surfaces in this predetermined relationship, the head slider is bonded to the head-engaging surface of the flexure tongue, with the bonding material filling any Z-height gaps provided by the multiply sloped shaped compensating feature.

DETAILED DESCRIPTION OF THE INVENTION

Figure 1:
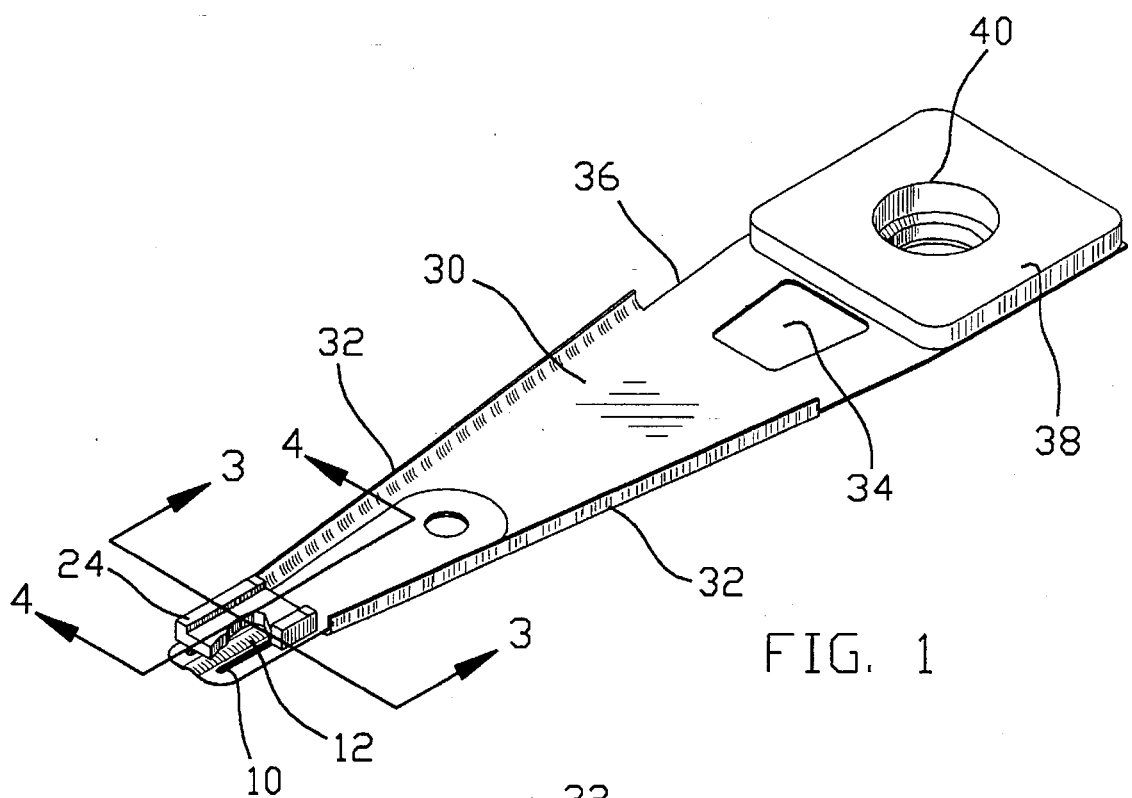
FIG. 1 is a perspective view of a gimballing flexure of the invention in which the flexure tongue is longitudinally cylindrically curved.
Figure 2:
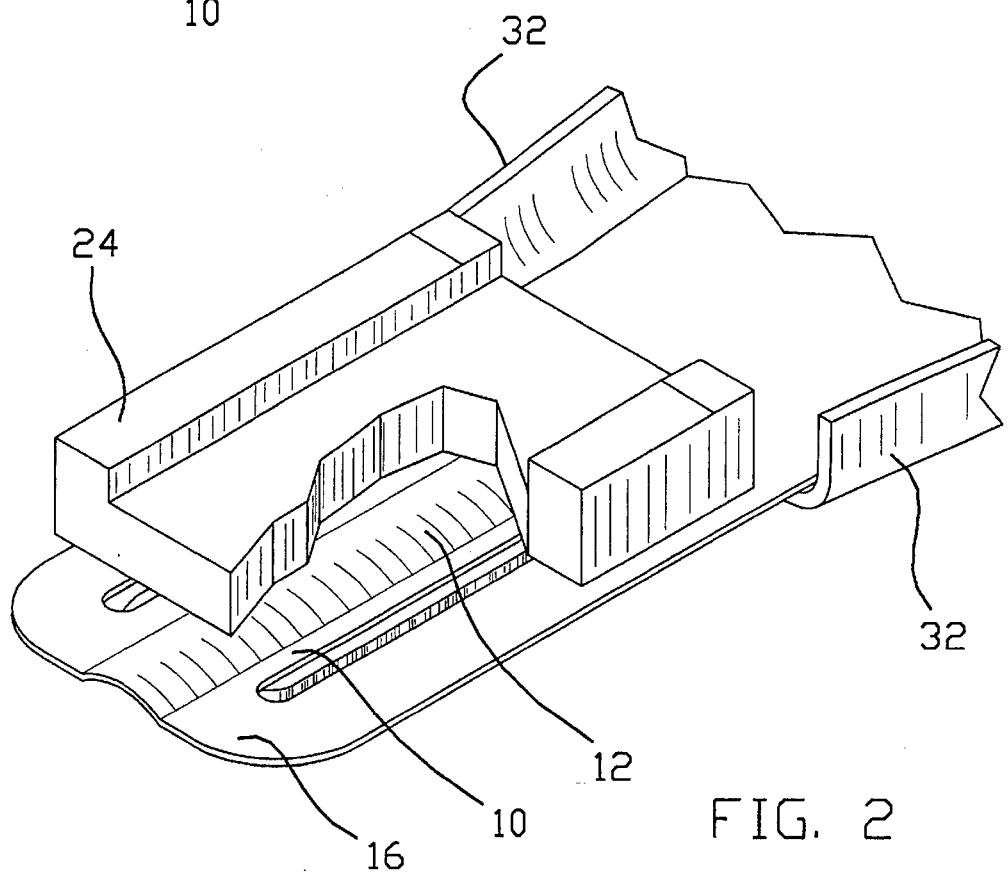
FIG. 2 is an enlarged sectional view of the flexure and head slider of FIG. 1.
Figure 3:
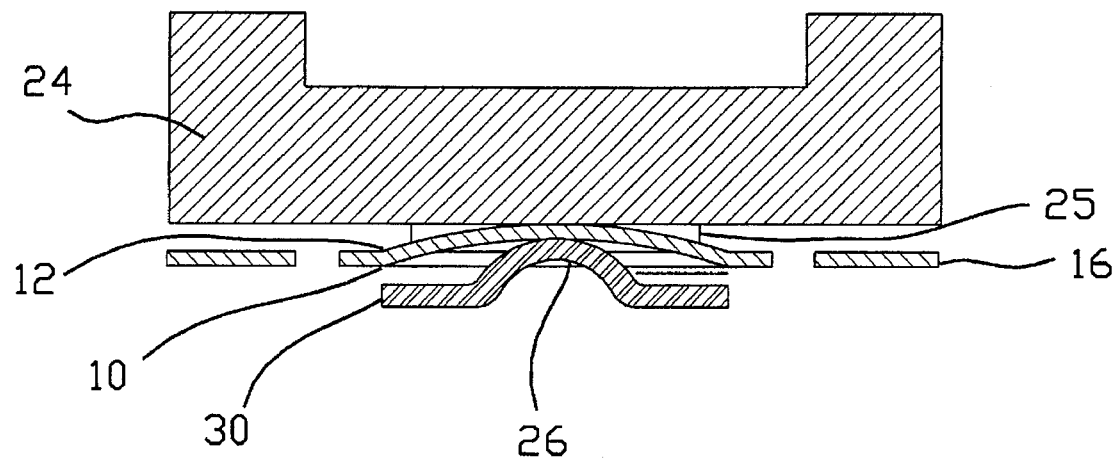
FIG. 3 is a sectional view of the flexure of FIG. 1.
Figure 4:
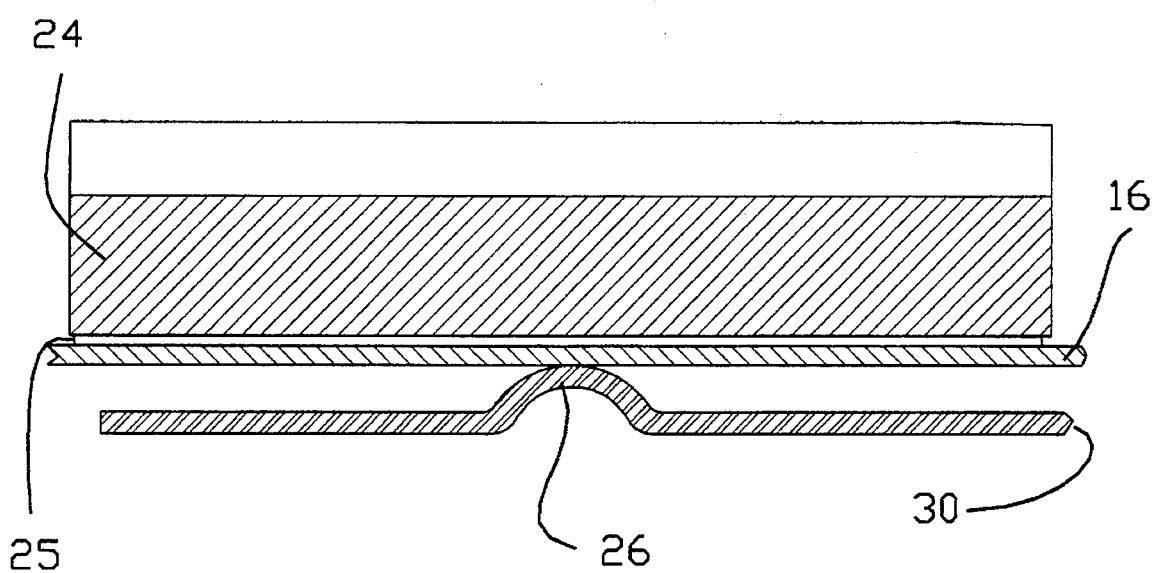
FIG. 4 is another sectional view of the flexure of FIG. 1.

FIGS. 1–6 illustrate two embodiments of a head suspension assembly of the invention in which the adhesive bond area between the flexure tongue and the top of the slider is used, in conjunction with the configuration of the multiply sloped feature on the flexure tongue, to eliminate or compensate for static roll and/or static pitch torques between the suspension and the slider.

In the assembly of FIGS. 1–5, the flexure tongue 10 is configured with a cylindrical shaped feature 12 which is curved in the shape of a section of a wall of a thin walled tube. Thus, cylindrical shaped feature 12 is sloped about a roll axis to correct for any roll axis static offset errors between the flexure tongue 10 and the head slider 24. This cylindrical shaped feature 12 can also be described as longitudinally cylindrical with its convex side oriented toward the attached head slider 24. As shown in FIGS. 1–5, the opposite surface of the tongue 10 is a corresponding concave surface to accommodate proper static roll attitudinal alignment of the load bearing dimple 26 on the load beam 30. The cylindrical shaped feature 12 provides an offset for clearance from the flexure 16 to the top of the head slider 24, and also provides a curved surface between the flexure tongue 10 and the top of the head slider 24 to accommodate any roll static attitude non-parallelism between the assembly and the top of the head slider 24.

Figure 5:
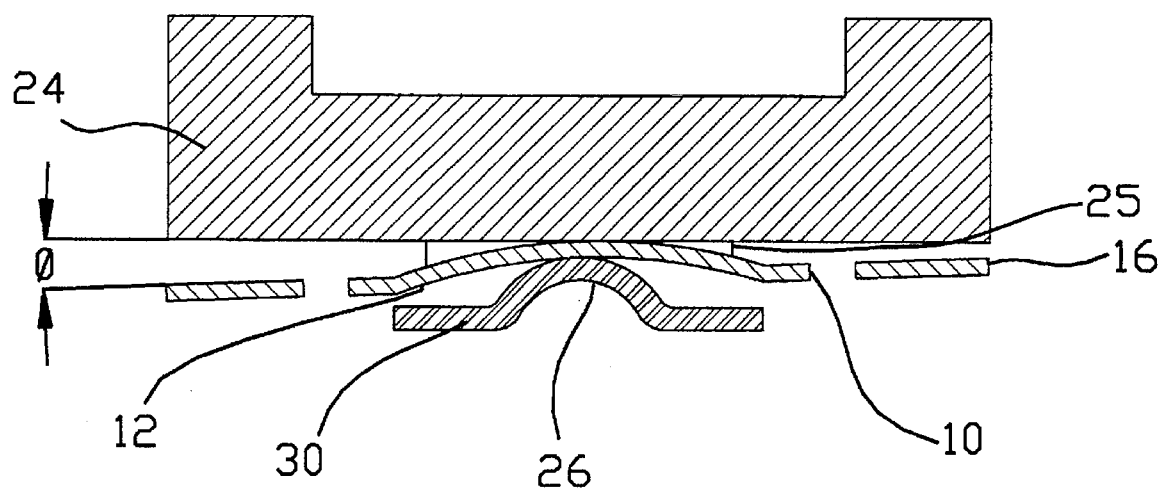
FIG. 5 is an sectional view of the flexure of FIG. 1, displaying a static roll.
Figure 6:
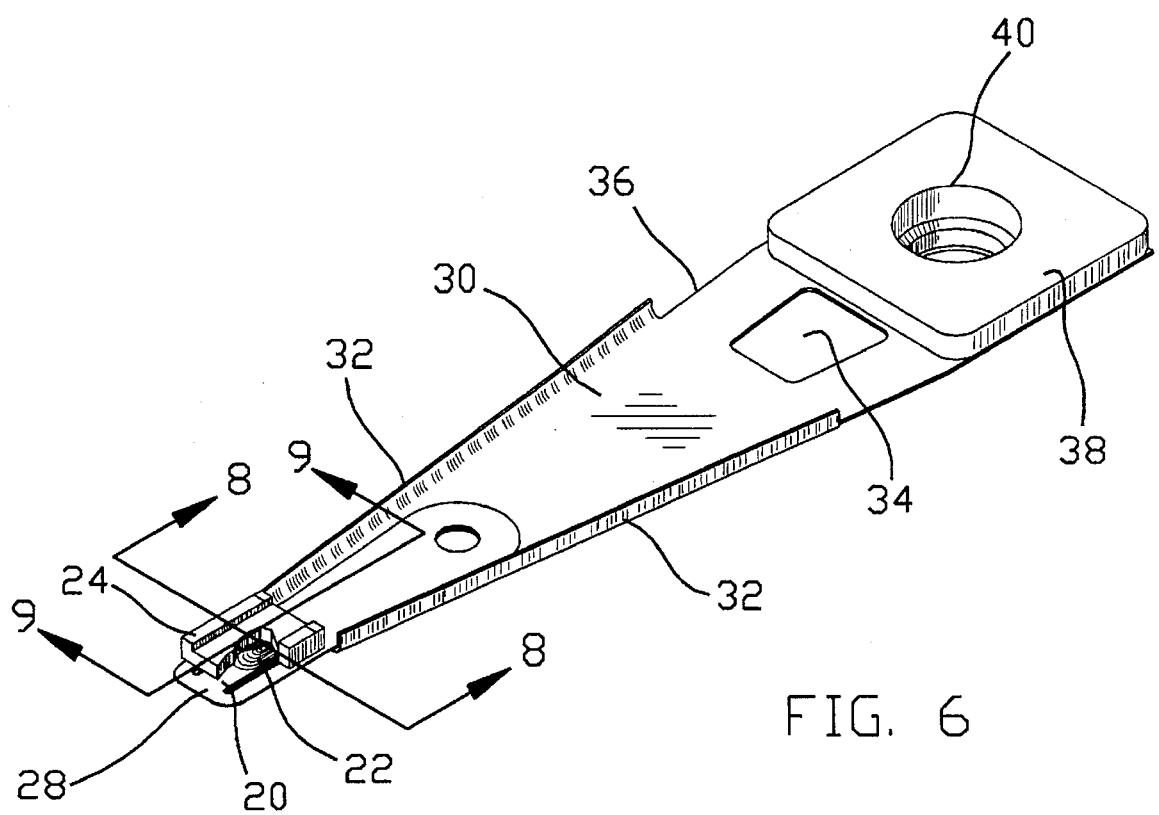
FIG. 6 is a perspective view of a second embodiment of a head suspension assembly of the invention in which the flexure tongue is provided with an ovoid shaped feature.
Figure 7:
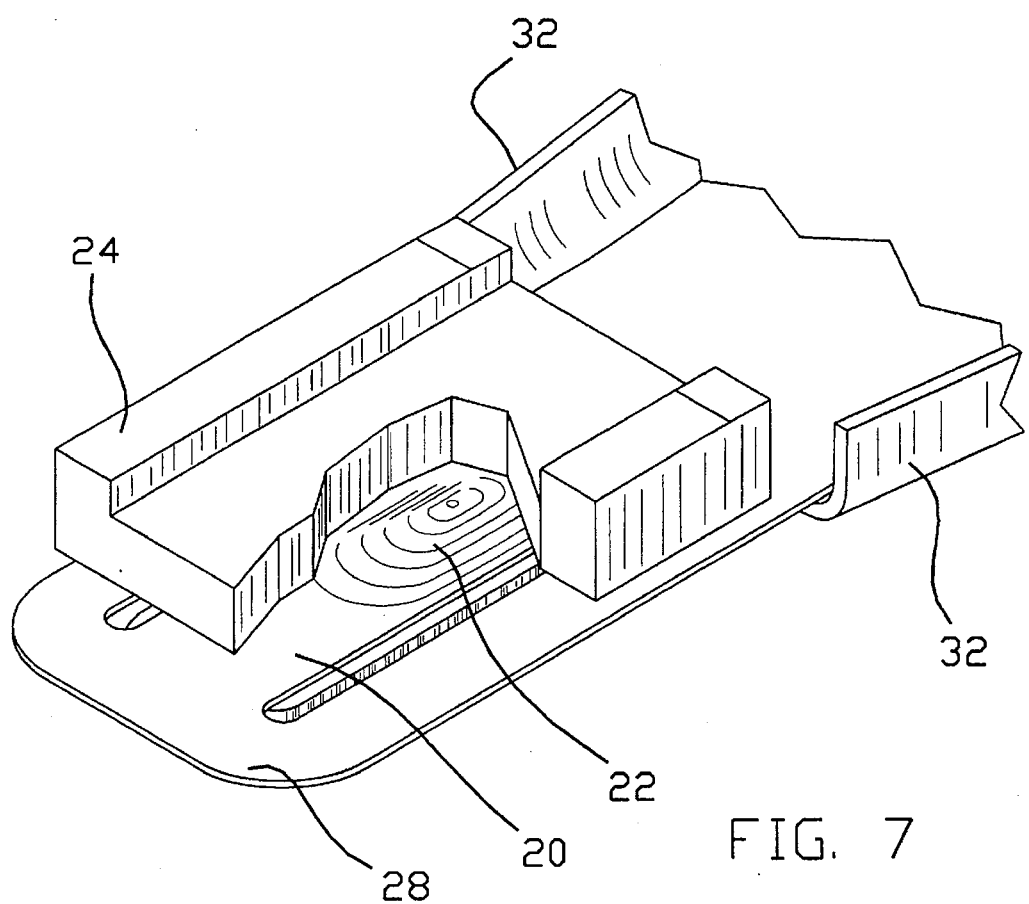
FIG. 7 is an enlarged sectional view of the flexure and head slider of FIG. 6.

In order to illustrate how the cylindrical shaped feature 12 on the flexure tongue 10 surface corrects for suspension static roll error, FIG. 5 represents a situation for a suspension with roll twist along the length of the suspension. The plane of the flexure 16 is shown tilted at an angle theta relative to the slider 24. The cylindrical shaped feature 12 and the adhesive 25 fill the space between the slider 24 and the flexure tongue 10 to allow bonding at the twisted angle and prevent roll torque from occurring in the completed assembly.

According to the present invention, this novel concept can also be extended to correcting for both roll and pitch errors by configuring the flexure tongue with a shaped feature which is curved along two axes, thus allowing compensation for both pitch and roll torques in assembling the head slider to the HSA.

Figure 8:
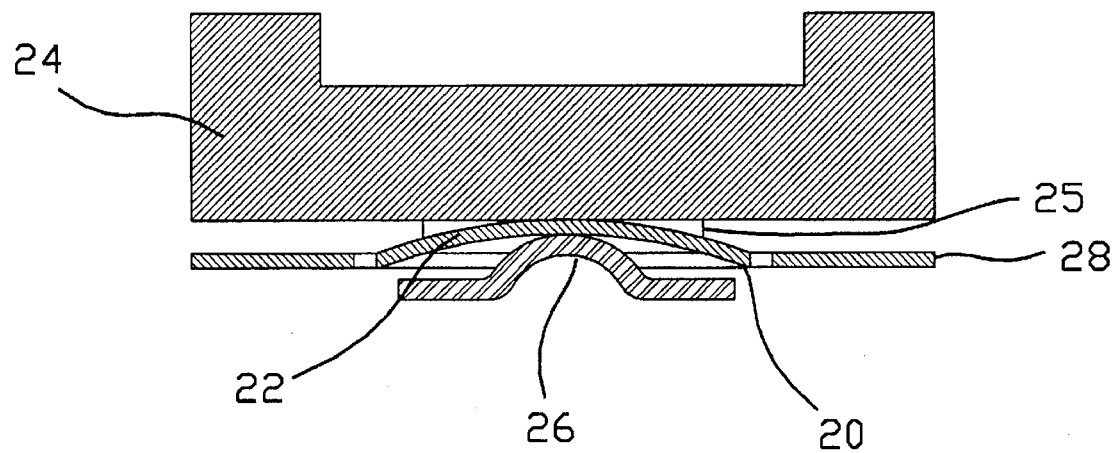
FIG. 8 is a sectional view taken from FIG. 6.
Figure 9:
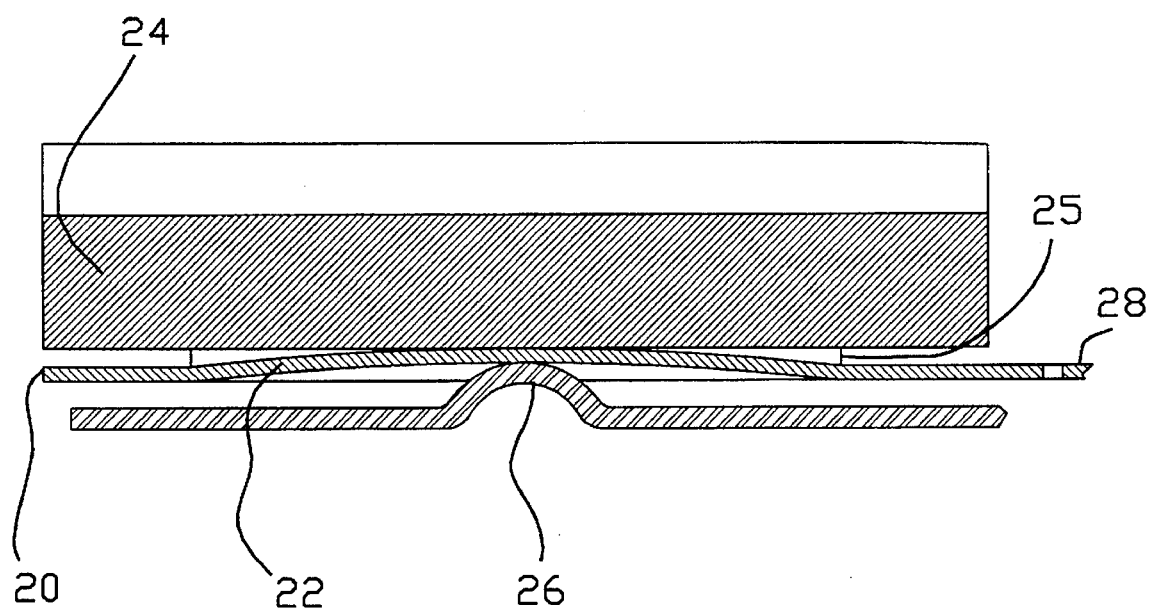
FIG. 9 is another sectional view taken from FIG. 6.

FIGS. 6–9 show the flexure tongue 20 with an ovoid shaped feature 22 sloped about both the pitch and roll axes, with the convex surface of the ovoid shaped feature 22 toward the associated head slider 24, in place of the cylindrical shaped feature 12 of the flexure tongue 10 of FIGS. 1–5. As can be seen in FIGS. 8 and 9, the opposite surface of the tongue 20 is configured with a corresponding concave surface feature to accommodate proper static pitch and roll attitudinal alignment of the load bearing dimple 26. This ovoid shaped feature 22 provides clearance from the flexure 28 to the top of the head slider 24 and also provides a curved surface between the flexure tongue 20 and the top of the head slider 24 to accommodate for both roll and pitch static attitude non-parallelism between the suspension and the top of the head slider 24, when the head slider 24 is attached to the ovoid shaped feature 22 through adhesive bond 25.

Also shown in the head suspension assemblies of FIGS. 1–9, are load beam 30 bounded by perimeter stiffening rails 32. A cutout 34 is in spring region 36. For mounting to an actuator arm, the proximal end of load beam 30 has base plate 38 with swage hole 40 through both the load beam 30 and the base plate 38.

Figure 10:
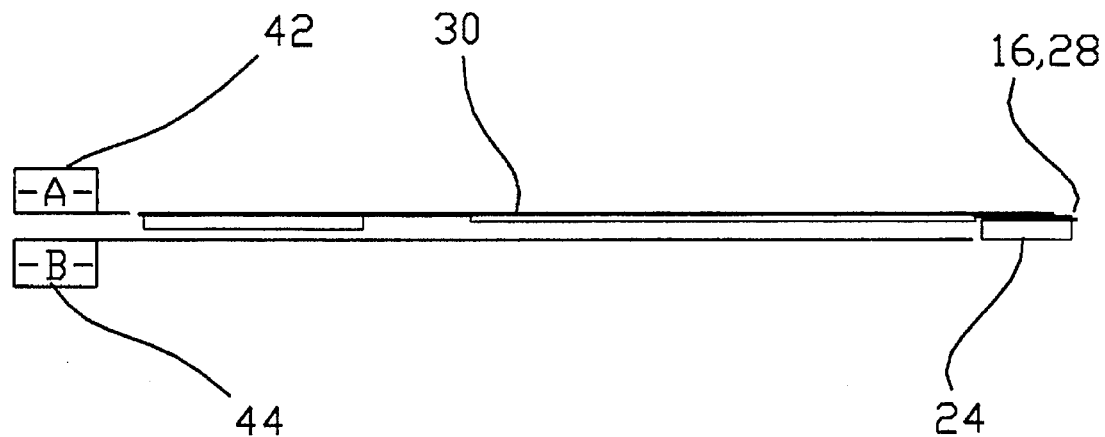
FIG. 10 is a view of a head suspension assembly of the invention positioned with reference to locating datum surfaces.

For assembling the slider 24 to the suspension assembly with a flexure 16 or 28 according to the present invention, a load beam mounting datum surface 42 and a head slider mounting datum surface 44 are provided in a predetermined parallel and planar relationship to each other and separated vertically a specified amount, as illustrated in FIG. 10. The load beam 30, provided with a flexure 16 or 28 of the present invention, is located with regard to the load beam datum surface 42, and the head slider 24 is located with regard to the head slider mounting datum surface 44. With the load beam 30 (and attached flexure 16 or 28) and the head slider 24 in this predetermined relationship to each other, the head slider 24 is adhesively mounted to the head-engaging surface of the flexure tongue 10, 20. Due to the cylindrical shaped feature 12 on the flexure tongue 10, or the ovoid shaped feature 22 on the flexure tongue 20, compensation is provided for any static torque offset errors between the tongue 10 or 20 and the head 24 along either the roll axis (for the flexure 16 shown in FIGS. 1–5) or the roll and pitch axes (for the flexure 28 shown in FIGS. 6–9), by the shaped feature 12 or 22 of the respective flexure tongue 10 or 20. The adhesive bond 25 thus absorbs or compensates for both static roll and pitch attitude error at the time of assembly, removing or substantially eliminating the error of static roll and pitch torque from the final HSA.

Figure 11:
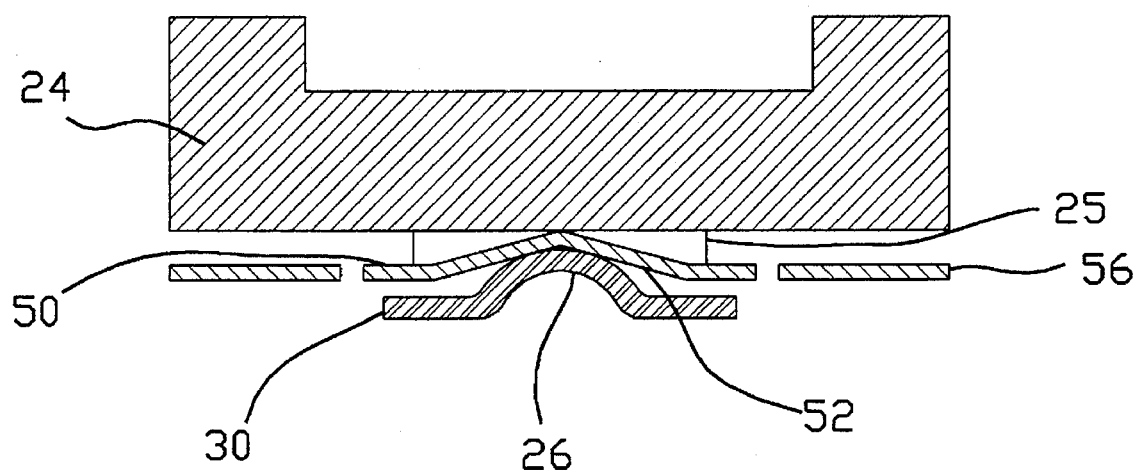
FIG. 11 is another embodiment of gimballing flexure of this invention in which the flexure tongue is provided with a sloped feature.

In the assembly of FIG. 11, the flexure tongue 50 has a V-grooved shaped feature 52 along a longitudinal axis of the flexure, with the apex of the V-grooved shaped feature 52 oriented toward the attached head slider 24. The interior surface of the V-grooved shaped 52 accommodates proper static roll attitudinal alignment of the load bearing dimple 26. This V-grooved shaped feature 52 provides an offset for clearance from the flexure 56 to the top of the head slider 24, and also provides compensating clearance between the flexure tongue 50 and the top of the head slider 24 to accommodate any roll static attitude non-parallelism between the assembly and the top of the head slider 24.

In FIGS. 1–5, the curvature of the cylindrical shaped feature 12 on the flexure tongue 10 is such that the side edges are each about 0.03 mm to about 0.06 mm offset vertically from the head slider 24, when in confronting relationship therewith. The curvature of the ovoid shaped feature 22 on flexure tongue 20 of FIGS. 6–9 is such that its perimeter edges are about 0.03 mm to about 0.06 mm offset vertically from the head slider 24, when in confronting relationship therewith. These distances are normal thicknesses for adhesive bonds between confronting surfaces of a flexure tongue and a head slider.

As has been noted above, in a conventional flexure design, the flexure tongue is offset from the flexure toward the head slider to allow gimballing clearance between the upper surface of the head slider and the lower surface of the flexure. This conventional offset is formed where the flexure tongue and cross piece join, in conjunction with the dimple that is formed on the flexure tongue. It will be noted that by providing a shaped feature sloped about a first and/or second axis on the flexure tongue, according to the present invention, it is not necessary to provide such a conventional offset of the flexure tongue from the flexure. However, this offset may be provided if desired. It will also be noted that, by providing a shaped feature sloped about a first and/or second axis on the flexure tongue according to the present invention, the load bearing dimple is instead provided in the load beam.

It will be of course obvious to those of skill in this art that a flexure having a curved shape along the pitch axis alone (that is, perpendicular to the longitudinal axis of the flexure) will provide compensation for static torque offset errors along the pitch axis alone.

What is claimed is:

1. A head suspension assembly for supporting a head slider from a disk drive actuator arm, including:

a load beam having a proximal end configured for mounting to the actuator arm, and a distal end; and a flexure tongue resiliently extending from the distal end of the load beam and having a slider-engaging surface configured for mounting to the head slider and which flexes to permit pitch and roll movement of a slider during use within a disk drive, said flexure tongue having a free end and at least a side free edge portion that connects with said free end so that said free end is movable during flexure of said flexure tongue, the slider-engaging surface including, when said free end of said flexure tongue is free of any applied forces by any structure of the head suspension assembly, a consistently formed and self-sustaining shaped feature extending from said slider-engaging surface to function as a pivot when mounting the head slider to the slider-engaging surface and permit correction for static offset errors between the flexure tongue and head slider to enable attainment of a desired angular relationship between the load beam and the head slider, said shaped feature configured to be rigidly mounted to the head slider to maintain said desired angular relationship.

2. The head suspension assembly of claim 1 wherein the shaped feature is curved about a first axis.

3. The head suspension assembly of claim 1 wherein the shaped feature includes a cylindrical section about a first axis.

4. The head suspension assembly of claim 1 wherein the shaped feature includes at least one slope about a first axis and one slope about a second non-parallel axis to permit correction for both first and second axis static offset errors between the flexure tongue and head slider.

5. The head suspension assembly of claim 4 wherein the shaped feature is a spherical section.

6. The head suspension assembly of claim 1 and further including a head slider rigidly mounted to the slider-engaging surface of the flexure tongue.

7. The head suspension assembly of claim 6 and further including adhesive bonding the head slider to the surface of the flexure tongue.

8. The head suspension assembly of claim 6, wherein planar surfaces of the tongue and a tongue engaging surface of the slider are not parallel to each other.

9. The head suspension assembly of claim 6 wherein the head slider is rigidly mounted to the slider-engaging surface of the flexure tongue with the load beam and head slider in a parallel relationship.

10. The head suspension assembly according to claim 1, and further including a load bearing dimple on the load beam.

11. A head suspension assembly for supporting a head slider on a disk drive actuator arm, comprising:

a load beam having proximal and distal ends and including:

a mounting plate on the proximal end of the load beam configured for mounting the load beam to the actuator arm; and a load bearing dimple on the distal end of the load beam; and a flexure on the distal end of the load beam, having a tongue resiliently extending from the flexure and engaged by the load bearing dimple, the tongue including a consistently formed and self-sustaining compensation feature having opposed dimple-engaging and slider-engaging surfaces, said self-sustaining compensation feature being separable from said load bearing dimple with its shape retained, the dimple-engaging surface of the feature engaged by the load bearing dimple, and the slider-engaging surface sloping about first and second perpendicular axes to function as a pivot when mounting the head slider to the slider-engaging surface and compensate for first and second axis static offset errors between the flexure tongue and the load beam mounting plate to enable attainment of a desired angular relationship between the load beam and the head slider, said slider-engaging surface of said compensation feature configured to be rigidly mounted to the head slider to maintain said desired angular relationship.

12. The head suspension assembly of claim 11 wherein the flexure tongue includes a compensation recess having a spherical section with slider-engaging and dimple-engaging surfaces.

13. The head suspension assembly of claim 11 wherein the flexure tongue includes a compensation recess having an ovoid spherical section with slider-engaging and dimple-engaging surfaces.

14. The head suspension assembly of claim 11 and including a head slider rigidly mounted to the slider-engaging surface of the flexure tongue with the load beam and head slider in a parallel relationship.

15. The head suspension assembly of claim 11 wherein the load bearing dimple has a radius of curvature smaller than a radius of curvature of the dimple-engaging surface of the compensation feature.

16. The head suspension assembly of claim 11 wherein the load bearing dimple and compensation feature have hemispherical shapes.

17. A head suspension for supporting a head slider from a disk drive rigid arm comprising, in combination:
   a load beam having a proximal end adapted for being mounted to the rigid arm and a distal end; and
   a flexure projecting from the load beam distal end, the flexure having a tongue with a free end that is movable to permit gimballing movement, the tongue having a slider-engaging surface including, when said free end of the flexure tongue is free of any applied forces by any structure of the head suspension, a consistently formed and self-sustaining shaped feature defining plural non-parallel pivot axes permitting pivotal movement of a head slider when mounting the head slider to the slider-engaging surface so as to allow for compensation of static torque offset errors between the tongue and the head along that axis to enable attainment of a desired angular relationship between the load beam and the head slider, said shaped feature configured to be rigidly mounted to the head slider to maintain said desired angular relationship.

18. A head suspension according to claim 17, wherein the shaped feature is a surface curved with respect to a pitch axis.

19. A head suspension according to claim 17, wherein the shaped feature is a surface curved with respect to a roll axis.

20. A head suspension according to claim 17, wherein the shaped feature is a surface curved with respect to both pitch and roll axes.

21. A head suspension according to claim 17, wherein the tongue is further provided with a mounting pad thereon for receiving the head slider.

22. A head suspension according to claim 17, wherein, the shaped feature is a cylindrical surface.

23. A head suspension according to claim 17, wherein the shaped feature is a spherical surface.

24. A head suspension according to claim 17, wherein the shaped feature is a convex surface.

25. A head suspension according to claim 17, wherein the shaped feature is a generally ovoid surface.

26. A head suspension according to claim 17, wherein the load beam is further provided with a load bearing dimple at the distal end thereof for confronting a concave surface of the tongue directly opposite the shaped feature.

27. A head suspension according to claim 26, wherein the load bearing dimple is formed with a protruding button for confronting concave surface.

28. The head suspension of claim 17 and including a head slider rigidly mounted to the slider-engaging surface of the flexure tongue with the load beam and head slider in a parallel relationship.

29. A head suspension assembly for supporting a head slider from a disk drive actuator arm, including:
   a load beam having a proximal end configured for mounting to the actuator arm, and a distal end; and
   a flexure resiliently extending from the distal end of the load beam and having a free end that is movable to permit pitch and roll movement of a head slider during use within a disk drive, and a slider-engaging surface configured for mounting to the head slider, the slider-engaging surface including, when said free end of said flexure is free of any applied forces by any structure of the head suspension assembly and thus in a free state, a consistently formed and self-sustaining shaped feature extending from the slider-engaging surface to function as a pivot when mounting the head slider to the slider-engaging surface and permit correction of static offset errors between the flexure and head slider to enable attainment of a desired angular relationship between the load beam and the head slider, said shaped feature configured to be rigidly mounted to the head slider to maintain said desired angular relationship.

30. The head suspension assembly of claim 29 and further including a head slider rigidly mounted to the slider-engaging surface of the flexure.

31. The head suspension assembly of claim 30 and further including adhesive bonding the head slider to the surface of the flexure.

32. The head suspension assembly of claim 30 wherein the head slider is rigidly mounted to the slider-engaging surface of the flexure with the load beam and head slider in a parallel relationship.

33. The head suspension assembly of claim 29 wherein the shaped feature includes a convex surface in the flexure.

34. The head suspension assembly of claim 29 wherein the shaped feature includes a generally spherical section.

* * * * *

UNITED STATES PATENT AND TRADEMARK OFFICE
CERTIFICATE OF CORRECTION

PATENT NO. : 5,661,619
DATED : August 26, 1997
INVENTOR(S) : Lloyd C. Goss

It is certified that error appears in the above-indentified patent and that said Letters Patent is hereby corrected as shown below:

Column 6, line 59,  , delete "SELL-SUSTAINING" and insert therefor -- SELF-SUSTAINING --

Signed and Sealed this

Eleventh Day of November, 1997

Attest:

BRUCE LEHMAN

Attesting Officer

Commissioner of Patents and Trademarks